UNITED STATES PATENT OFFICE.

HELEN ROSE, OF MILFORD, MASSACHUSETTS, ASSIGNOR TO HERSELF AND GILES SANFORD, OF SAME PLACE.

IMPROVED WASHING-FLUID.

Specification forming part of Letters Patent No. 41,124, dated January 5, 1864.

*To all whom it may concern:*

Be it known that I, HELEN ROSE, a resident of Milford, in the county of Worcester and State of Massachusetts, have invented a new and useful Washing Composition or Fluid; and I do hereby declare the same to be fully described in the following specification.

In carrying out the said invention, which may be said to be a hydro-alcoholic alkaline solution, I add to sixteen quarts of water four pounds of sal-soda, one pound and a half of lime, (either slaked or unslaked,) and about one-half a gill of alcohol. The sal-soda and lime are first to be put into the water while the latter may be in a boiling state. The water is next to be thoroughly stirred until the soda and lime may have become dissolved, after which the solution should be suffered to stand until cooled to atmospheric or about ordinary atmospheric temperature. Next, pour off or separate the liquid solution from what sediment there may be in it and add it to the alcohol.

This solution is intended for cleansing clothes or fabrics, and to be used with soap in water. One quart of the fluid or composition is to be poured into thirty-two quarts of water while in a hot or boiling state. To the solution about one-quarter of a pound of soap cut into small pieces should be added and dissolved therein.

The clothes or fabrics to be cleansed should be first soaked for about twelve hours in clear and cool water, after which they (after having been removed from the water and having had the latter wrung out of them) should be boiled for about one hour in the detergent solution composed of the hydro-alcoholic alkaline solution and soap, above specified, when they will be found to have been well cleansed. After this they may be removed from the boiling solution and be immersed in water and be wrung out and suffered to dry.

The composition constituting my invention has been found to be highly useful in cleansing clothes, the alcohol, when combined with the sal-soda and the lime, causing them to operate to far better advantage than they or either of them will without it.

I claim—

The said hydro-alcoholic alkaline solution, as made in manner and for use substantially as hereinbefore specified.

HELEN ROSE.

Witnesses:
R. H. EDDY,
F. P. HALE, Jr.